UNITED STATES PATENT OFFICE.

NELSON T. TILMAN, OF XENIA, INDIANA.

IMPROVEMENT IN WRITING-INKS.

Specification forming part of Letters Patent No. 194,015, dated August 7, 1877; application filed June 23, 1877.

*To all whom it may concern:*

Be it known that I, NELSON T. TILMAN, of Xenia, in the county of Miami and State of Indiana, have invented a new and valuable Improvement in Writing-Fluids; and I do hereby declare that the following is a full, clear, and exact description of the same.

The nature of my invention consists in a compound for writing-fluid, as will be hereinafter more fully set forth.

My compound for writing-fluid is composed of the following ingredients, viz: One and one-half ounce chloride tincture of iron; one-half ounce acetic acid; six ounces strong solution chloride of sodium; four drams pulverized extract of logwood. These ingredients are mixed together and stirred well for a few minutes, and I then add six grains bichromate of potash, after which the entire compound is allowed to stand for seven days, more or less. It is then strained through two or three thicknesses of muslin, when it is ready for use.

I do (of course) not confine myself to the precise proportions of the ingredients herein mentioned, as they may be varied to suit circumstances; and in place of logwood, any other coloring matter may be used, or other coloring matter may be used with the logwood.

What I claim as new, and desire to secure by Letters Patent, is—

A writing-fluid composed of the following ingredients, to wit: Tincture of the chloride of iron, acetic acid, solution chloride of sodium, pulverized extract of logwood, and bichromate of potash, in or about the proportions set forth.

In testimony that I claim the above I have hereunto subscribed my name in the presence of two witnesses.

NELSON T. TILMAN.

Witnesses:
NOAH HARRIS,
M. MAPLE.